US011961071B2

United States Patent
Alfeche et al.

(10) Patent No.: US 11,961,071 B2
(45) Date of Patent: Apr. 16, 2024

(54) SECURE TRANSACTIONS OVER COMMUNICATIONS SESSIONS

(71) Applicant: Capital One Services, LLC, McLean, VA (US)

(72) Inventors: Alana Alfeche, Aurora, IL (US); Sahana Arya, Edison, NJ (US)

(73) Assignee: Capital One Services, LLC, McLean, VA (US)

( * ) Notice: Subject to any disclaimer, the term of this patent is extended or adjusted under 35 U.S.C. 154(b) by 78 days.

(21) Appl. No.: 17/165,148

(22) Filed: Feb. 2, 2021

(65) Prior Publication Data
US 2022/0245628 A1   Aug. 4, 2022

(51) Int. Cl.
G06Q 20/38   (2012.01)
G06Q 20/04   (2012.01)
G06Q 20/40   (2012.01)

(52) U.S. Cl.
CPC ......... *G06Q 20/3821* (2013.01); *G06Q 20/04* (2013.01); *G06Q 20/40145* (2013.01); *G06Q 20/405* (2013.01)

(58) Field of Classification Search
None
See application file for complete search history.

(56) References Cited

U.S. PATENT DOCUMENTS

| | | | |
|---|---|---|---|
| 5,550,897 A | 8/1996 | Seiderman | |
| 7,024,174 B2 | 4/2006 | Nagy et al. | |
| 9,460,430 B1 * | 10/2016 | Ho | G06Q 20/24 |
| 10,805,083 B1 | 10/2020 | Abad et al. | |

OTHER PUBLICATIONS

<https://help.venmo.com/hc/en-us/articles/217042888-How-It-Works>, Describes how Venmo allows users to pay using their smartphone, printed Feb. 2, 2021, 2 pages.
<https://mobiletransaction.org/how-to-take-payments-over-the-phone/>, Describes conventional ways of taking payments over the phone, Jun. 9, 2020, 8 pages.
<https://www.paymentvision.com/payment-services/channels/ivr-bill-pay>, describes voice recognition-based online payment system, printed Feb. 2, 2021, 10 pages.

* cited by examiner

*Primary Examiner* — Matthew S Gart
*Assistant Examiner* — Amit Patel
(74) *Attorney, Agent, or Firm* — Banner & Witcoff, Ltd.

(57) ABSTRACT

Methods and systems for authenticating communications sessions, such as voice and video calls, are described herein. A communications session, such as a video or voice call, may be detected. The communications session may relate to a transaction, such as a financial transaction. An authorization request may be received during the communications session. The authorization request may be received by a secure transaction application and via a first communications channel that is different from a second communications channel used for the communications session. A request to approve one or more goods or services to be purchased via the transaction may be displayed. In response to user input responding to the request, an authorization of the transaction may be transmitted to a server. The authorization may be configured to cause the server to initiate payment for the transaction using payment information associated with a user.

20 Claims, 5 Drawing Sheets

SECURE TRANSACTIONS OVER COMMUNICATIONS SESSIONS

FIELD OF USE

Aspects of the disclosure relate generally to securing transactions conducted via communications sessions, such as voice calls, video calls, text messaging sessions (e.g., virtual assistant chat sessions), and the like. More specifically, aspects of the disclosure may provide for secure transactions via ongoing communications sessions by permitting users to approve, during the communications session and using a separate authentication process, a financial transaction.

BACKGROUND

Many people still conduct purchases via voice calls, video calls, and text messaging sessions (e.g., chatting with virtual assistants). For example, many individuals still manually call local restaurants to place an order, rather than using a website or food delivery application. In some circumstances, these calls can be significantly cheaper and more effective than applications or websites. For example, by using a call, a customer seeking to order pizza can clearly state their request (e.g., detail precisely what they want on a pizza), whereas a pizza store can avoid sometimes-costly service fees associated with popular delivery applications and website hosts. As another example, by using a call or text messaging session, customers can avoid using websites, which might be prone to cybersecurity risk (and which might be prohibitively expensive for a merchant to design, maintain, and protect from attack).

Though many prefer to conduct purchases over the phone, conducting transactions over voice and video calls is risky. To pay for a transaction over the phone, customers might have to read their credit card information out loud, but doing so is risky: the customer could be overheard nearby, the call could be monitored, and/or the other party could use their legitimately-acquired credit card information to conduct an unrequested transaction. For example, a nefarious pizza store employee might secretly write down credit card information when taking orders over the phone, then later use the credit card information to make unauthorized purchases. While some customers and merchants seek to avoid this risk by conducting the actual payment before or after a communications session (e.g., later sending a customer an invoice, asking a customer to pay via credit card when they show up in person to pick up goods, or the like), this approach can be undesirable at least because mistakes may occur. For example, if a pizza store employee misunderstands a customer and makes the wrong kind of pizza, when the customer shows up to pick up a pizza and discovers the pizza was incorrectly made, the customer may refuse payment or otherwise complain.

Aspects described herein may address these and other problems, and generally improve the quality, efficiency, and speed of communications systems by improving the security of transactions conducted via communications sessions.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for securing transactions conducted via communications sessions using a separate, parallel authentication process conducted between a secure transaction application and a server. This may advantageously allow individuals to authenticate themselves and pay for transactions of goods and services during communications sessions (e.g., video or voice calls, chat sessions with virtual assistants, text messaging sessions, etc.), which provides additional transaction accuracy while also allowing merchants to collect funds more reliably. According to some aspects, these and other benefits may be achieved by using a secure transaction application to authenticate users (e.g., a participant on a video or voice call), to ensure that a purchaser approves of goods and/or services to be purchased in a transaction, and/or to effectuate payment for such goods and/or services (e.g., using a payment method, such as a credit card). This may be effected using a communications channel different from a communications channel used to conduct a communications session. In this way, a user may remain on a video and/or voice call and/or continue to participate in a chat session, but might also be able to simultaneously handle authentication, good/service confirmation, and payment via a separate communications channel.

More particularly, some aspects described herein may provide a computer-implemented method for authenticating communications sessions. A secure transaction application executing on a computing device may detect a communications session initiated by the computing device. The communications session may be a voice call, a video call, a chat session (e.g., a chat session with a virtual assistant), a text messaging session, or the like. Such a communications session need not be performed by a smartphone, but might be performed by a wearable device, such a smartwatch, a smart speaker, or the like. The communications session may relate to a transaction, such as one involving goods and/or services. For example, the communications session might involve a customer (e.g., a first user) calling into a restaurant (and, e.g., to a second user, such as a restaurant employee) to place a delivery order. As another example, the communications session might comprise a web browser-enabled chat session with a virtual assistant (e.g., an artificial intelligence trained to take orders, answer questions, or the like). The communications session may be initiated by an application different from the secure transaction application. The secure transaction application may receive, from a server and during the communications session, an authorization request corresponding to the transaction. That authorization request may be received via a first communications channel that is different from a second communications channel used for the communications session. For example, the communications session may be a video call, whereas the authorization request may be received over the Internet and using a secure transaction application separate from a video call application. The secure transaction application may display a request to approve one or more goods or services to be purchased via the transaction. For example, the display of the request may comprise displaying, based on the authorization request, an indication of the one or more goods or services to be purchased via the transaction. The secure transaction application may receive, in response to the request, user input indicating whether the transaction is authorized. For example, a user, such as a customer, might approve the transaction, thereby indicating that their credit card should be charged in an amount displayed by the secure transaction application. In response to the user input, an authorization of the transaction may be transmitted to the server. The authorization of the transaction may be configured to cause the server to initiate payment for the transaction using payment information associated with the user. For example, transmitting the authorization of the transaction may comprise causing the server to transmit, to a second computing device associated with a participant of the communications session, the payment information.

According to some embodiments, an identity of a user of the computing device may be determined, and transmitting the authorization of the transaction may be based on the identity of the user. The identity of the user may be determined by processing, using a machine learning model, voice data from the communications session. The identity of the user may be determined by executing, by the computing device, one or more facial recognition algorithms. Also, according to some embodiments, merchant history data that indicates a history of transactions associated with a merchant may be received from the server. The transaction may be compared to the history of transactions associated with the merchant and, based on the comparing, display of an indication of whether the transaction is similar to the history of transactions associated with the merchant may be caused.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
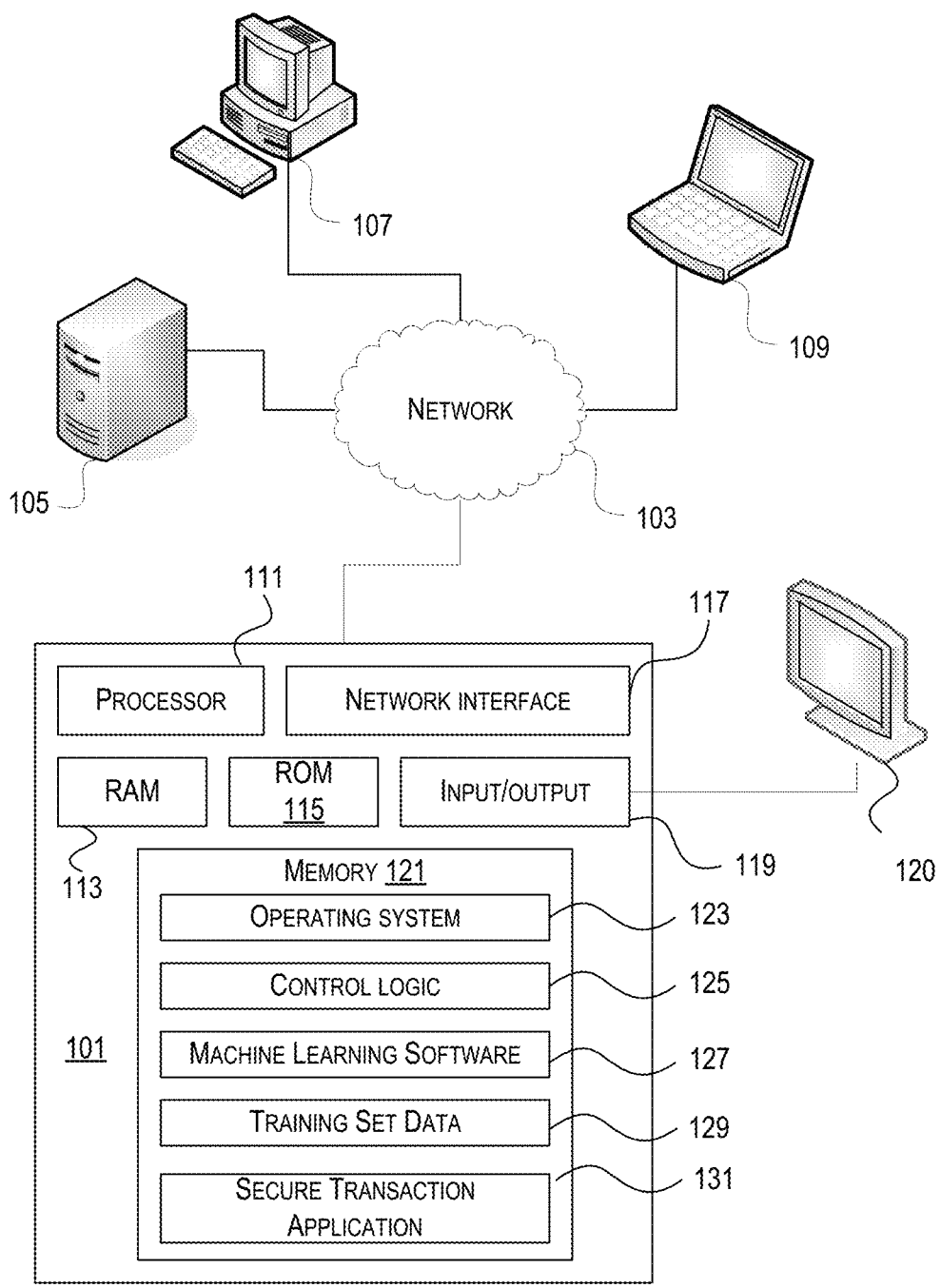
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for secured transactions over communications sessions by conducting a separate, parallel payment process using a communications channel separate from an ongoing communications session. As discussed further herein, this combination of features may allow participants of communications sessions (e.g., voice and video calls, chat sessions, text messaging sessions) to authenticate themselves, review the particulars of a transaction, and/or exchange funds for goods and services, even if the communications session itself might be insecure. This has a broad variety of benefits—among others, it allows transaction participants to exchange funds for goods and services in a more streamlined manner, it helps avoid errors in the transaction process, and it allows merchants to receive payment earlier in the transaction process. For example, a customer of a pizza shop might be motivated to use the system described herein at least because it might not require that they read their credit card number aloud on a call (or find cash in their home to pay for delivery) and because it might permit them to review the transaction before approving a credit card charge. On the other hand, the pizza shop might be motivated to use the system described herein at least because it might make the payment process (and funds collection process) significantly easier and because it might allow the pizza shop to avoid the risk of order mistakes.

The present disclosure improves the functioning of computers by improving the method in which communications are performed via computers. Though popular, communications sessions (e.g., voice and video calls, text messaging sessions, chat sessions, and the like) are ill-equipped to handle the transfer of confidential information. For example, though many call participants nonetheless do so, it is generally inadvisable to read a credit card number aloud during a call. The present disclosure describes a parallel system which does not impact the ordinary function of an ongoing communications session, but with nonetheless allows participants to request for user authentication, verify transaction details, and effectuate payment for transactions. This process involves unique computer-specific processes, such as leveraging separate communication channels and remote, trusted servers to effectuate the transfer of sensitive information. As such, the present disclosure could not be performed by humans.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and a secure transaction application 131. The control logic 125 may be incorporated in and may be a part of machine learning software 127. As will be described further below, the secure transaction application may be executable to allow users to conduct secure transactions during a communications session, such as a video or voice call. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a discussing devices which may be used to secure transactions conducted via communications sessions. In particular, as a preliminary matter, the structure of such a system will be discussed.

Figure 2:
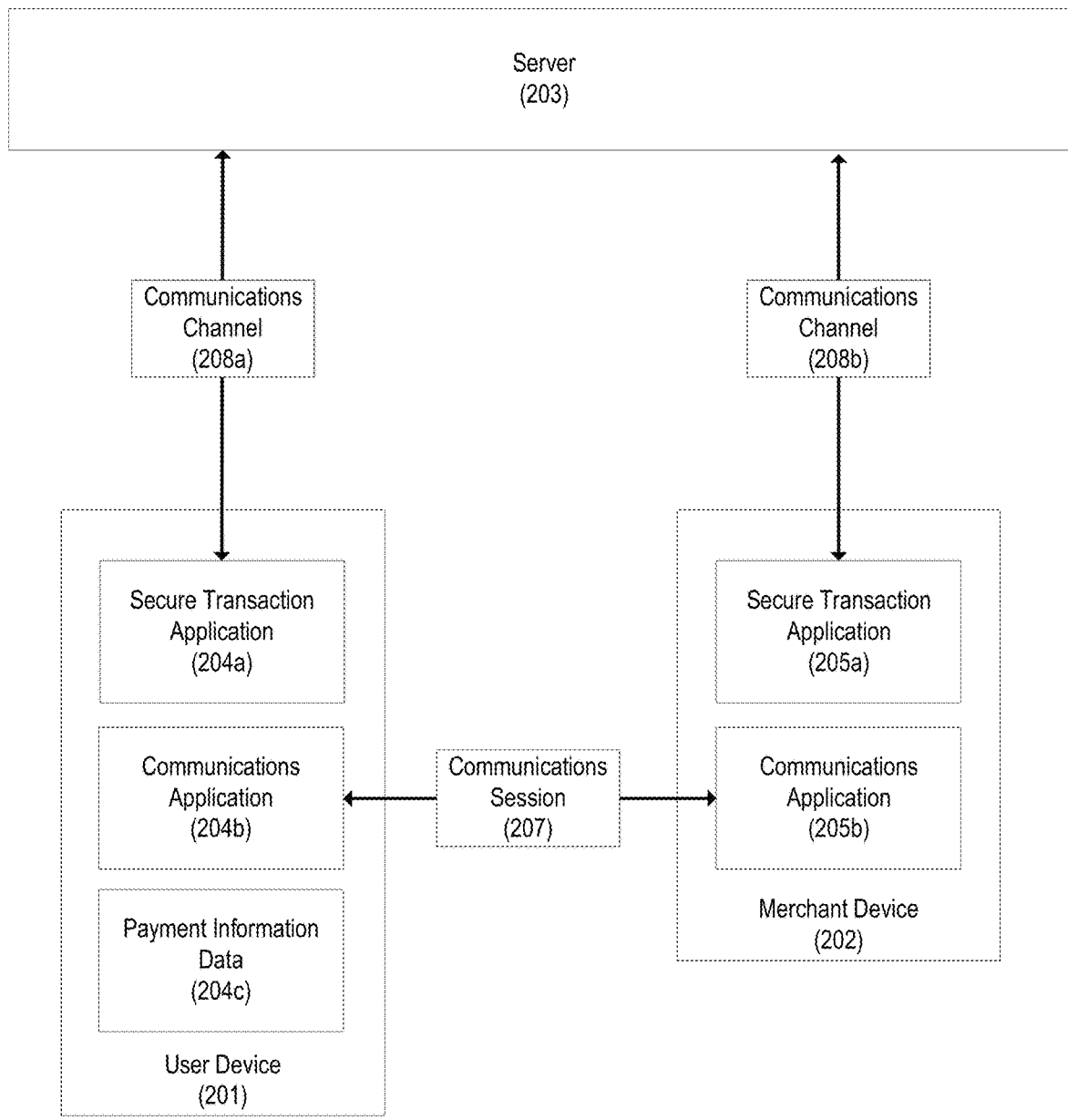
FIG. 2 depicts an example secure transaction architecture according to one or more aspects of the disclosure.

FIG. 2 depicts an illustrative system comprising a user device 201, a merchant device 202, and a server 203. The user device 201 is shown having a secure transaction application 204a (which may be the same or similar as the secure transaction application 131), a communications application 204b, and payment information data 204c. The merchant device 202 is shown having a secure transaction application 205a (which may be the same or similar as the secure transaction application 131) and a communications application 205b (which may be the same or similar as the communications application 204b). The server 203 is shown as communicatively coupled, via a communications channel 208a, to the secure transaction application 204a of the user device 201. The server 203 is also shown as communicatively coupled, via a communications channel 208b, to the secure transaction application 205a.

The user device 201, the merchant device 202, and/or the server 203 may be any form of a computing device, and may be the same or similar as the computing device 101. For example, the user device 201 might be a smartphone, and the merchant device 202 might be a point-of-sale system or similar computing device used by an organization to take orders. The user device 201 might also be a wearable device (e.g., a smart watch), a smart speaker, or the like. In some instances, the merchant device 202 might be split into two devices, one executing the secure transaction application 205a and another handling the communications session 207. For example, in some circumstances, the merchant device 202 might be a computer communicatively coupled to a standard landline telephone which might handle the communications session 207 without using the communications application 205b.

As may be seen in FIG. 2, the communications application 204b and the communications application 205b may be communicatively connected (e.g., via the network 103) by a communications session 207. A communications session, such as the communications session 207, may be a voice call, video call, a text call (e.g., as may be used by individuals with hearing impairments), a text messaging session, a chat session (e.g., such as one involving a virtual assistant, such as an artificial intelligence configured to take orders and/or answer questions), or similar form of communication whereby the users of the user device 201 and/or the merchant device 202 may communicate. For example, the communications application 204b may be a phone application on a smartphone, and the communications session 207 may be an ongoing voice call. As another example, the communications application 204b may be a web browser executing on a laptop, and the communications session 207 may be a chat session with a virtual assistant. Such a communications session may be instantiated by a user of either the user device 201 and/or the merchant device 202 based on identifying information of the other of the user device 201 and/or the merchant device 202. For example, a user might enter a phone number, associated with the merchant device 202, into the communications application 204b of the user device 201, and thereby instantiate a video call (the communications session 207) with the communications application 205b.

A communications session may correspond to a transaction. For example, a user of the user device 201 might place a call to purchase a pizza, arrange for house repairs, or the like. That said, the communications session 207 might not be sufficiently secure for the purposes of transferring payment information, such as might be part of the payment information data 204c. For example, it might be undesirable for a user of the user device 201 to read a credit card number aloud during the communications session 207, as unauthorized parties might hear (and thereby be able to steal) the credit card number. As such, user of the user device 201 and/or the merchant device 202 may want to exchange payment information (e.g., such that a user of the user device 201 can purchase goods and/or services from a merchant associated with the merchant device 202), but may want to do so in a manner whereby security is preserved. As will be described in more detail below, this may be effectuated using separate communications channels (e.g., the communications channel 208a and/or the communications channel 208b) along with a server 203.

A secure transaction application, such as the secure transaction application 204a, the secure transaction application 205a, and/or the secure transaction application 131, may comprise an application configured to provide a secure transaction during the communications session 207. The secure transaction application 205a may be all or portions of a banking application, and/or may be affiliated with a banking application. The secure transaction application 205a of the merchant device 202, for example, may be configured to receive information about goods and/or services from a user of the merchant device 202 and then, using the communications channel 208b, transmit such information to the server 203. In turn, the server 203 may transmit information about the goods and/or services to the secure transaction application 204a of the user device 201 via the communications channel 208a. In this manner, during the communications session 207, the user device 201 and the merchant device 202 may use a separate communications channel to transmit information about the transaction. Such communications channels (e.g., those separate from the communications channel used to effectuate the communications session 207) may similarly and/or alternatively be used to transmit authentication information about a user of the user device 201, to transmit payment information associated with the user device 201 (e.g., all or portions of the payment information data 204c), or the like. In this manner, such transmissions may occur during the communications session 207 and without interrupting the communications session 207.

It should be noted that, although the communications channels used by the user device 201 and/or the merchant device 202 to communicate with each other and/or the server 203 may be different, they need not be different protocols. For example, the communications session 207 may be an Internet-based video call, and the communications between the user device 201 and the server 201 may also be via the Internet.

The payment information data 204c of the user device 201 may be credit card information, bank account information, online payment account information, or similar information which may permit a user of the user device 201 to pay for goods and/or services. For example, the payment information data 204c may comprise information associated with a cryptocurrency wallet and/or a similar repository of cryptocurrency funds. All or portions of the payment information data 204c may be transmitted to the server 203 as part of an approval of a transaction, such that goods and/or services of the transaction may be paid for. Additionally and/or alternatively, the payment information data 204c may be stored by the server 203. In such a circumstance, the user device 201 need only transmit an approval of a transaction to the server 203, and the server 203 may use payment information data (e.g., stored in a memory of the server 203) to pay for one or more goods and/or services of a transaction. The payment information data 204c may be encrypted or obfuscated for security purposes.

As an example of the process depicted in FIG. 2, a user of the user device 201 may call, using the communications application 204b, the merchant device 202 to order a pizza. An employee of the merchant (e.g., a different user) may answer the call using the communications application 205b. By answering, the communications session 207 may be established. The user of the user device 201 and the user of the merchant device 202 may talk over the phone. At some time when the pizza order is finalized, the user of the merchant device 202 may input information into the secure transaction application 205a, such as a pizza type, delivery time, cost, and the like. The secure transaction application 205a may transmit, to the server 203, that information. The server 203 may validate the information and transmit, via the communications channel 208a, information about the transaction to the secure transaction application 204a of the user device 201. Once received, the user device 201 may authenticate the user of the user device 201, display information about the requested transaction (e.g., information about the pizza to be ordered), and receive user input indicating whether the transaction should be authorized. Based on the user input, the secure transaction application 204a may transmit, via the communications channel 208a and to the server 203, at least a portion of the payment information data 204c. The server 203 may then use this payment information data 204c to effectuate payment for the transaction, thereby ensuring that the merchant has payment for the pizza and that the user of the user device 201 has confirmed that the correct pizza has been ordered. The payment information need not be transmitted to the merchant device 202 in this scenario: for example, to approve the transaction, the server 203 may use the payment information with a payment processing engine to effectuate a credit card payment for the transaction and to ensure that the appropriate funds are received by the merchant.

Discussion will now turn to the perspective of the user device 201, and in particular steps which may be performed to effectuate a secure transaction during the communications session 207.

Figure 3:
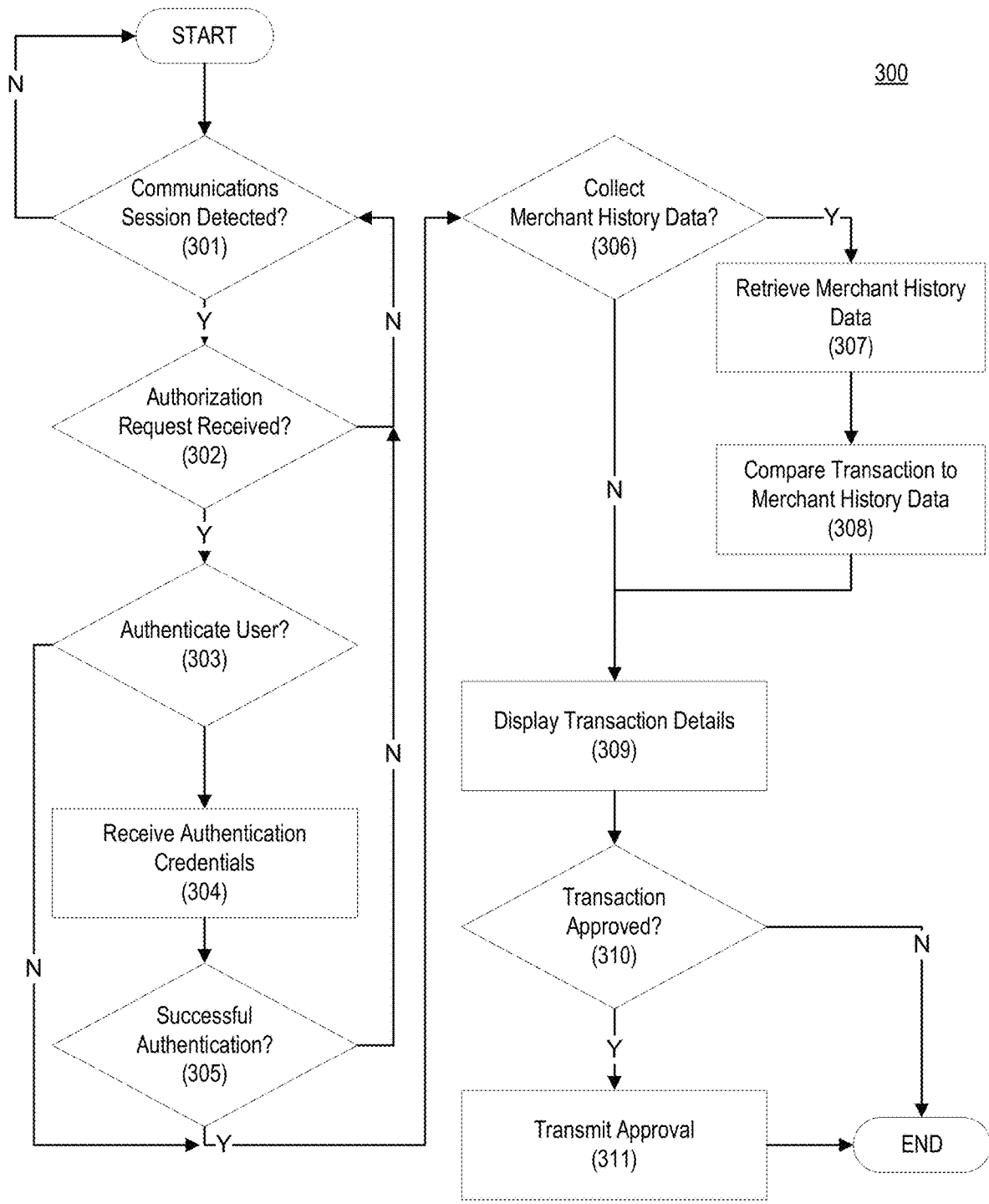
FIG. 3 depicts a flow chart for a method of securing transactions conducted via communications sessions.

FIG. 3 illustrates an example method 300 for securing a transaction associated with a communications session in accordance with one or more aspects described herein. The method 300 may be implemented by a suitable computing system, as described further herein. For example, the method 300 may be implemented by any suitable computing environment by a computing device and/or combination of computing devices, such as computing devices 101, 105, 107, and 109 of FIG. 1. For instance, the method 300 may be performed by the user device 201, including the secure transaction application 204a of the user device 201. For simplicity, text below will discuss steps from the perspective of the user device 201; however, such steps may additionally and/or alternatively be performed by other computing devices. For example, the device performing the steps of FIG. 3 need not have the payment information data 204c shown as part of the user device 201 of FIG. 2. The method 300 may be implemented in suitable program instructions, such as in machine learning software 127, and may operate on a suitable training set, such as training set data 129.

In step 301, the user device 201 may determine whether a communications session exists. The communications session may be the same or similar as the communications session 207, and may be a video, voice, and/or text call between the user device and another device (such as the merchant device 202). Determining whether a communications session exists may comprise detecting whether a communications application (e.g., a voice and/or video chat application, such as the communications application 204b) is active, whether one or more antennas of the user device 201 are in use, whether an operating system flag indicates that a call is ongoing, or the like. If a communications session is detected, the method 300 may proceed to step 302. Otherwise, the method 300 returns to the beginning and waits to detect a communications session.

As part of step 301, the secure transaction application 204a may receive a request to initiate a communication session, and the secure transaction application 204a may cause a different application (e.g., the communications application 204b) to initiate the communications session. In this manner, a user of the user device 201 might initiate a call using the secure transaction application 204a, and the secure transaction application 204a may thereby learn that the communications session exists as part of causing the communication session to be established. This approach might be taken if, for example, the secure transaction application 204a is a banking application which allows users to browse merchants and call them to conduct secure transactions. For example, a user might use the secure transaction application 204a to browse nearby pizza restaurants, then press a button to initiate a call with the pizza restaurant using a separate application (e.g., the communications application 204b).

In step 302, the user device 201 may determine whether an authorization request has been received. An authorization request may correspond to a transaction associated with the communications session detected in step 301. For example, if the communications session is a call about ordering a pizza, the authorization request may relate to a pizza transaction. Such an authorization request may be received from a server, such as the server 203, and may be received via a first communications channel that is different from a second communications channel used for the communications session. For example, the authorization request may be received via the communications channel 208a, rather than the channel used to establish the communications session 207. The authorization request may be received during a communications session (e.g., the communications session 207).

The authorization request may comprise transaction details indicating one or more goods or services to be purchased via a transaction. For example, if the requested transaction is a pizza purchase, the transaction details might include the identity of the pizza (e.g., size, toppings), information about delivery of the pizza (e.g., whether the pizza will be delivered or the user should pick it up), payment request information (e.g., a price per good/service, applicable tax, a total cost), and the like.

In step 303, the user device 201 may determine whether to authenticate the user. Determining whether to authenticate the user may comprise determining an identity of the user to, for example, ensure that the user is authorized to use a particular payment method and/or is authorized to use the user device 201. Determining whether to authenticate the user may be based on the authorization request. For example, the user device 201 might determine to authenticate the user if the total cost of a transaction indicated by the authorization request exceeds a predetermined threshold. As another example, the user device 201 might determine to authenticate the user if the authorization request indicates particular items, such as purchases from an unknown merchant. To that end, the user device 201 may store thresholds for whether the user should be authenticated for particular merchants. In that manner, a user of the user device 201 may define, in advance, which transactions should require additional user identification steps, and/or which transactions may be processed without additional authentication. If the user device determines to authenticate the user, the method 300 may proceed to step 304. Otherwise, the method 300 proceeds to step 306.

In step 304, the user device 201 may receive authentication credentials. Authentication credentials may be any form of authentication of a user of the user device 201. For example, the user device 201 may receive voice data from the communications session 207 (by, e.g., recording and/or otherwise capturing the communications session 207 via the communications application 204b). As another example, the user device may receive, via one or more cameras (e.g., front-facing cameras of a smartphone), an image of the user. As other examples, the user device may receive a password or other alphanumeric string, fingerprint data from a fingerprint reader, or the like.

In step 305, the user device 201 may determine whether the user has successfully been authenticated. Determining whether the user has successfully been authenticated may be based on the authentication credentials received in step 304. Determining whether the user has successfully been authenticated may comprise determining an identity of the user, such as determining whether an authorized user is currently using the user device 201. For example, if the data comprises voice data, then the user device 201 may determine an identity of a user by processing, using a machine learning model (e.g., one trained as part of the machine learning software 127), the voice data. To effectuate such processing, the machine learning model may be trained based on a history of voice samples of a user (e.g., as part of the training set data 129), such as by recording and/or otherwise monitoring previous calls associated with a user. As another example, if the data comprises an image of the user, then the user device 201 may determine an identity of a user of the computing device by executing, by the computing device, one or more facial recognition algorithms. As yet another example, if the data comprises a password, then the user device 201 may determine an identity of the user based on whether the password is correct. The authentication process may use one or more authorization algorithms, and multiple forms of authentication may be performed: for example, in some circumstances, a user might be required to provide both a fingerprint and a password to authenticate themselves. If the authentication has been successfully performed, the method 300 may proceed to step 306. Otherwise, the method may return to the beginning.

As part of step 305, the user device 201 may determine whether an identified user is authorized to use a particular payment method. A user might provide valid authentication credentials and be identified, but might not be permitted to use a particular payment method. As such, the determination in step 305 need not be limited to whether a user provides a correct password, but might instead comprise an inquiry as to whether a user has been successfully identified as well as whether that user is permitted to use a payment method to conduct transactions.

In step 306, the user device 201 may determine whether to collect merchant history data. Merchant history data may be any information about previous transactions associated with a merchant. For example, merchant history data for a pizza shop may indicate that the pizza shop customarily sells goods (e.g., pizzas, breadsticks) at approximately $10-15/ea. at all days of the week and offers both delivery as well as pick-up options. As another example, merchant history data for a car repair shop may indicate that the shop customarily sells services on Monday through Friday, but does not offer any form of delivery of their services. As such, it may be desirable to collect merchant history data to determine whether a present transaction comports with prior transactions conducted by a merchant. That said, the determination of whether to collect merchant history data may be based on the availability of such data. For example, the server 203 may be configured to store merchant history data for only certain merchants, and the determination of whether to collect the merchant history data may be based on the merchant history data being found on the server 203.

In step 307, the user device 201 may retrieve merchant history data. The merchant history data may be received from, for example, the server 203 or another device configured to store the merchant history data. The merchant history data might be received via, for example, the communications channel 208a.

In step 308, the user device 201 may compare the transaction associated with the communications session with the merchant history data. The transaction may be compared with the merchant history data to determine whether the transaction requested is similar to past transactions conducted by a merchant. For example, if a requested transaction is for ten thousand dollars but the merchant is associated only with transactions under one hundred dollars, then the requested transaction may be said to be dissimilar to past transactions. The comparison might result in a score, associated with the transaction, that indicates a degree of similarity between the transaction and the merchant history data. For example, if a merchant customarily sells products for twenty dollars but requests a transaction for two thousand dollars, the score might be zero or a similar value which indicates that the transaction is significantly different than past transactions and thus potentially untrustworthy.

In step 309, the user device 301 may display transaction details. The transaction details may be all or portions of the authentication request received in step 302 as well as, if applicable, the merchant history data retrieved in step 307. The transaction details may be displayed in a user interface, such as an interface of the secure transaction application 204a.

Displaying the transaction details may comprise displaying indications of one or more goods or services to be purchased via the transaction. By allowing a user to review a transaction, the user is able to correct mistakes and ensure that the desired transaction is being conducted. This advantageously ensures that the transaction is less likely to be incorrect and, for example, disputed at a later date. The one or more goods or services may be displayed as a list with detail, such as a price of each good and/or service, a unique item identifier of each good and/or service, a photo of each good and/or service, or the like.

In step 310, the user device 201 may determine whether the user approves the transaction. The user device 201 may make such a determination by receiving user input indicating whether the transaction is authorized. For example, a user interface of the secure transaction application 204a may permit a user to push a button to approve a transaction, to push a different button to dispute the transaction, or the like. If the user approves the transaction, the method 300 proceeds to step 311. Otherwise, the method 300 ends.

In step 311, the user device 201 may transmit an approval of the transaction. Transmitting approval of the transaction may comprise causing a device, such as the server 203, to initiate payment for the transaction. For example, the approval of the transaction may cause the server 203 to initiate payment for the transaction using payment information associated with a user of the user device 201. Transmitting the approval of the transaction may additionally and/or alternatively comprise causing the server 203 to transmit, to a second computing device associated with a participant of the communications session, the payment information. In such a circumstance, the second computing device might be a credit card processing system, a banking system, or the like, such that the transmission may cause payment of the transaction.

Figure 4:
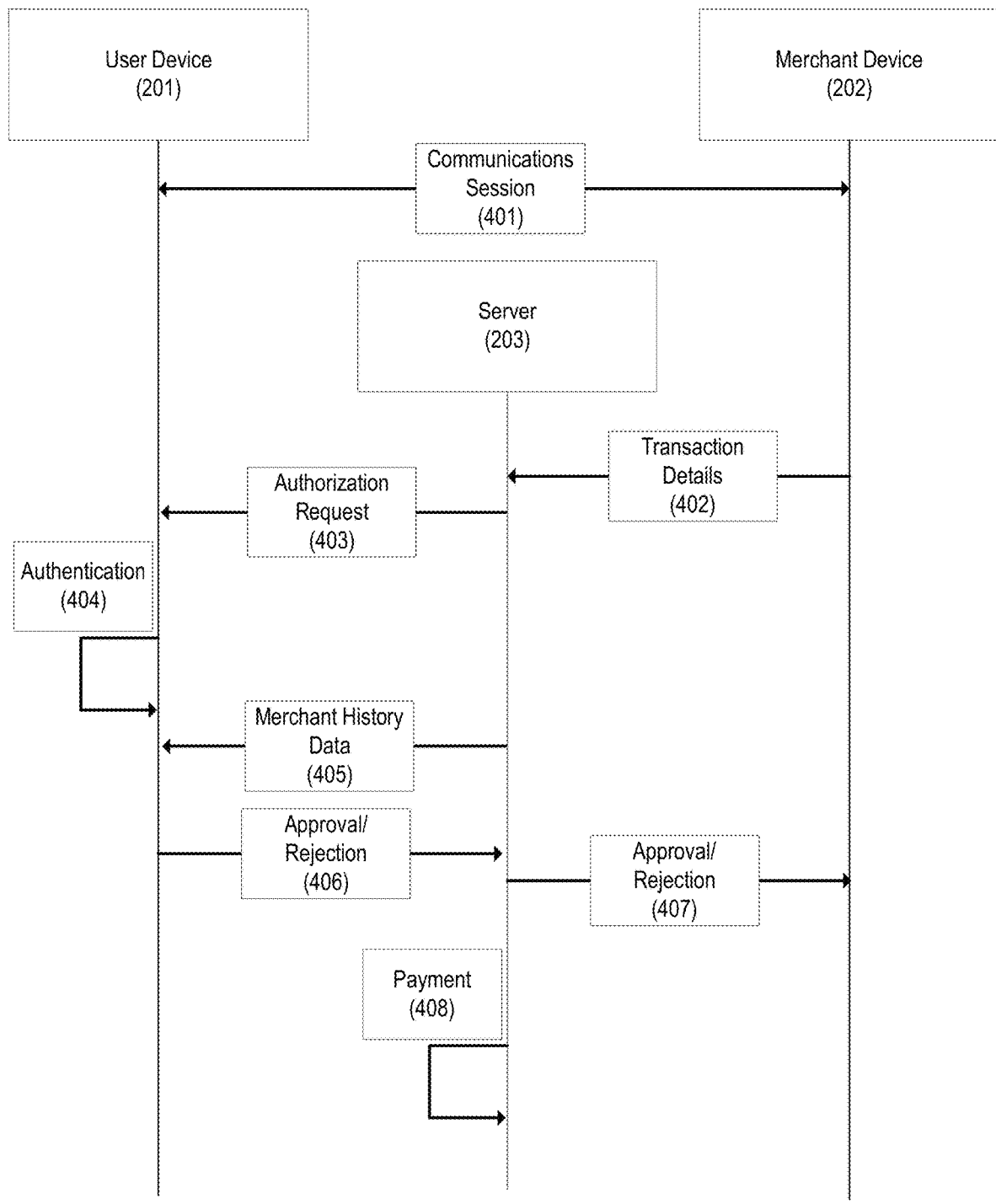
FIG. 4 depicts a messaging diagram between a user device, a merchant device, and a server.

Discussion will now turn back to the overall system shown in FIG. 2. FIG. 4 is a messaging diagram of the process described with respect to FIG. 2 which illustrates many of the steps discussed in FIG. 3. The user device 201, the merchant device 202, and the server 203 are the same as depicted with respect to FIG. 2.

In step 401, the user device 201 and merchant device 202 maintain a communications session. The communications session may be the same or similar as the communications session 207 of FIG. 2. Though the communications session in step 401 is shown at the beginning of the messaging diagram, all subsequent steps shown in FIG. 4 (e.g., steps 402-408) may be performed during the communications session.

In step 402, the merchant device 202 may transmit transaction details to the server 203. As indicated in step 302 of FIG. 3, the transaction details may comprise information about one or more goods or services associated with a transaction. That transaction may correspond to the communications session of step 401. The transaction details might comprise, for example, information about goods/services (e.g., name, price, a photo, etc.), an identifier of the merchant, authenticating details of the merchant, or the like.

In step 403, the server 203 may transmit an authorization request to the user device 201. The authorization request may comprise some or all of the transaction details received in step 402. This step may be the same or similar as step 302 of FIG. 3.

In step 404, the user device 201 may, if desired, authenticate a user of the user device 201. This process may be the same or similar as steps 303 through 305 of FIG. 3.

In step 405, the server 203 may send, to the user device 201, merchant history data. This step may be the same or similar as steps 306 through 308 of FIG. 3.

In step 406, the user device 201 may transmit an approval or a rejection to the server 203. This step may be the same or similar as step 311 of FIG. 3. As indicated with respect to that step, this transmission may comprise payment details, such as a credit card number.

In step 407, the server 203 may transmit, to the merchant device, an indication of whether the transaction was approved or rejected by the user of the user device 201. The merchant device need not receive payment details from the server 203. For example, the transmission of step 407 may be as simple as a Boolean indication of whether the transaction is approved.

In step 408, and if the transaction has been approved, the server 203 may take steps to effectuate payment of the transaction. Such steps may include transmitting all or portions of payment details and/or the transaction details to a payment processor.

Discussion will now turn to examples of user interfaces which may be provided by secure transaction applications, such as the secure transaction application 204a. Such user interfaces are illustrative, and have been simplified to highlight various aspects of the disclosure herein.

Figure 5A:
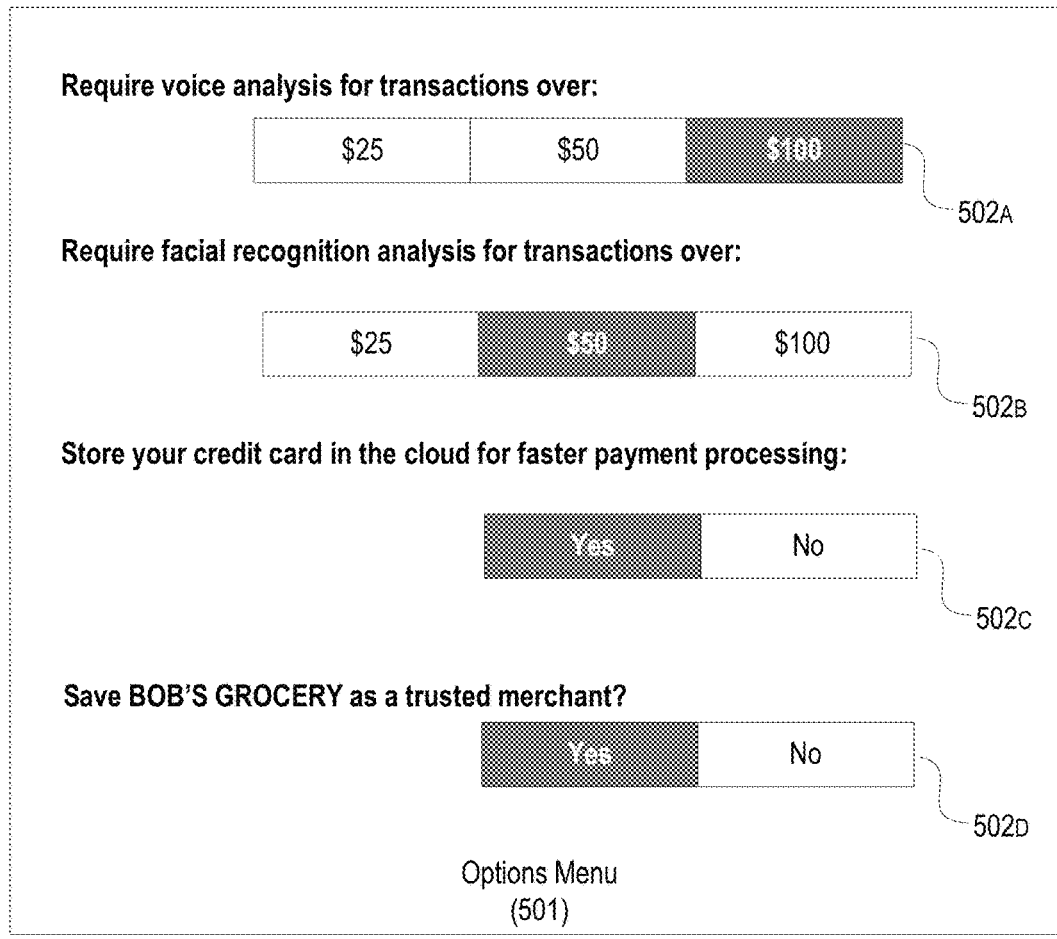
FIG. 5A depicts an example of an options menu which may be displayed by a secure transaction application.

FIG. 5A shows an example options menu 501 which comprises settings which may be set by a user of the user interface 201. Four settings are shown. A first setting 502a may allow users to set a monetary threshold for voice analysis. As indicated with respect to steps 303-305 of FIG. 3, such voice analysis may be performed by a machine learning algorithm, such as a machine learning model implemented by the machine learning software 127, and may be based on voice data captured from a communications session. A second setting 502b may allow users to set a monetary threshold for facial recognition. As indicated with respect to steps 303-305 of FIG. 3, such facial recognition may be performed based on images of a user captured by one or more cameras of the user device 201. A third setting 502c may allow a user to set where payment details may be stored. As indicated with respect to FIG. 2, payment information data such as the payment information data 204c may be stored on the user device 201, but may additionally and/or alternatively be stored on the server 203. A fourth setting 502d may allow a user to save a particular merchant as a trusted merchant. In some instances, a user may permit transactions from a particular merchant without requiring the authentication steps described herein. For example, if a user regularly orders lunch from a particular restaurant over the telephone, then the user might want the transaction to be automatically approved, rather than be forced to manually approve the transaction every day. Such a setting might be optional, and may be limited by various conditions. For example, a user might only be able to automatically permit transactions under a certain dollar amount, during a particular period of time, or the like.

Figure 5B:
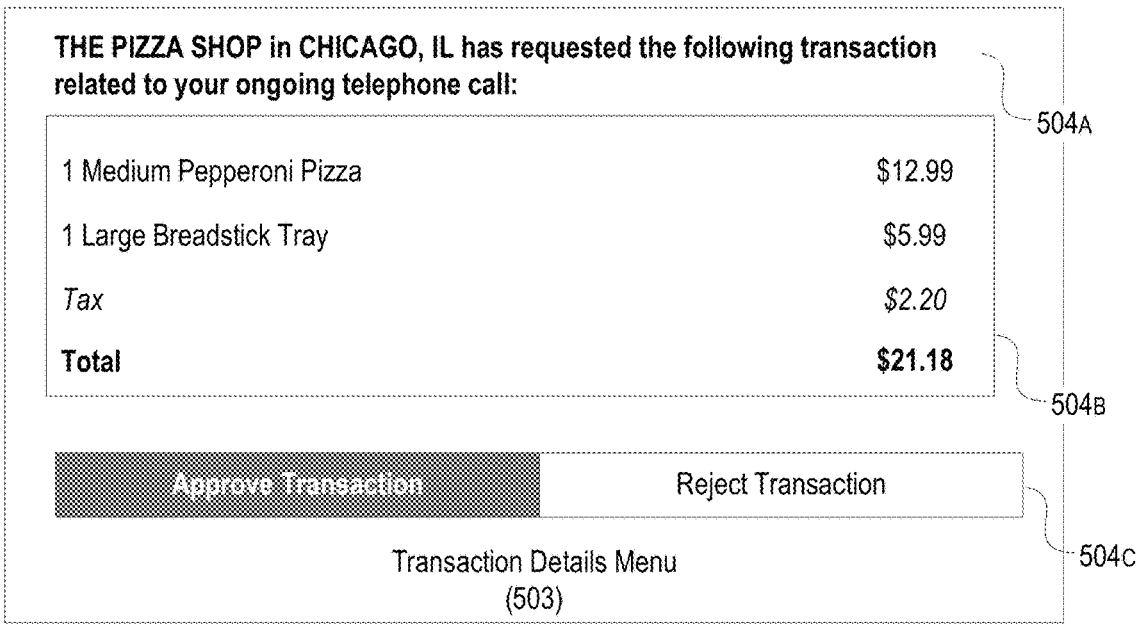
FIG. 5B depicts an example of a transaction details menu which may be displayed by a secure transaction application.

FIG. 5B illustrates an example transaction details menu. The transaction details menu 503 indicates transaction details including contextual information 504a and transaction goods information 504b. The contextual information 504a identifies the merchant requesting the transaction (The Pizza Shop), a location of the merchant (Chicago, IL), and indicates that the merchant is associated with an ongoing communications session. The transaction goods information 504b comprises identifying information about goods to be purchased in the transaction (specifically, a pizza and a breadstick tray), the cost of each item, the tax for the transaction, and a total cost of the transaction. The transaction approval buttons 504c allow a user to approve or reject the transaction. Based on the user input provided using the transaction approval buttons 504c, the user device 201 may transmit an approval as described with respect to step 311 of FIG. 3.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for securely authenticating users conducting transactions during electronic calls, the method comprising:
   detecting, by a secure transaction application executing on a computing device, first user input corresponding to a user interface element that initiates, by the computing device, a communications session, wherein the communications session is one of: a voice call, or a video call;
   receiving, by the secure transaction application, from a server, and during the communications session, an authorization request corresponding to a transaction, wherein the authorization request is received via a first communications channel that is different from a second communications channel used for the communications session;
   causing display, via a user interface of the secure transaction application executing on the computing device, of a request to approve one or more goods or services to be purchased via the transaction;
   receiving, via the user interface of the secure transaction application, in response to the request, and during the communications session, second user input indicating whether the transaction is authorized;
   identifying, during the communications session, the user of the computing device by processing, using a trained machine learning model, voice data from the communications session, wherein the trained machine learning model was generated by training, using training data comprising a history of voice samples captured during past calls by a user, a machine learning model to identify the user based on voice samples of the user;
   determining, by the secure transaction application, based on identifying the user, and based on comparing one or more properties of the transaction to a threshold, whether to authenticate a user of the computing device; and
   in response to the second user input and based on determining to authenticate the user of the computing device, transmitting, to the server, an authorization of the transaction, wherein the authorization of the transaction is configured to cause the server to initiate payment for the transaction using payment information associated with the user.

2. The method of claim 1, wherein causing display of the request to approve the one or more goods or services comprises:
   displaying, based on the authorization request, an indication of the one or more goods or services to be purchased via the transaction.

3. The method of claim 1, further comprising:
   determining the training data by recording one or more previous calls associated with the user.

4. The method of claim 1, wherein identifying the user further comprises:
   executing, by the computing device, one or more facial recognition algorithms.

5. The method of claim 1, further comprising:
receiving, from the server, merchant history data that indicates a history of transactions associated with a merchant;
comparing the transaction to the history of transactions associated with the merchant; and
causing, based on the comparing, display of an indication of whether the transaction is similar to the history of transactions associated with the merchant.

6. The method of claim 1, wherein the communications session is initiated by an application different from the secure transaction application.

7. The method of claim 1, wherein the transmitting the authorization of the transaction comprises:
causing the server to transmit, to a second computing device associated with a participant of the communications session, the payment information.

8. The method of claim 1, further comprising:
receiving, by the secure transaction application, a request to initiate the communications session; and
initiating, by a second application executing on the computing device and in response to the request, the communications session.

9. An apparatus configured to securely authenticate users conducting transactions during electronic calls, the apparatus comprising:
one or more processors; and
memory storing instructions that, when executed by the one or more processors, cause the apparatus to:
detect, via a secure transaction application, first user input corresponding to a user interface element that initiates, by the apparatus, a communications session, wherein the communications session is one of: a voice call, or a video call;
receive, via the secure transaction application, from a server, and during the communications session, an authorization request corresponding to a transaction, wherein the authorization request is received via a first communications channel that is different from a second communications channel used for the communications session;
cause display, via a user interface of the secure transaction application, of a request to approve one or more goods or services to be purchased via the transaction;
receive, via the user interface of the secure transaction application, in response to the request, and during the communications session, second user input indicating whether the transaction is authorized;
identify, during the communications session, the user of the computing device by processing, using a trained machine learning model, voice data from the communications session, wherein the trained machine learning model was generated by training, using training data comprising a history of voice samples captured during past calls by a user, a machine learning model to identify the user based on voice samples of the user;
determine, via the secure transaction application, based on the identifying the user, and based on comparing one or more properties of the transaction to a threshold, whether to authenticate a user of the apparatus; and
in response to the second user input and based on determining to authenticate the user of the computing device, transmit, to the server, an authorization of the transaction, wherein the authorization of the transaction is configured to cause the server to initiate payment for the transaction using payment information associated with the user.

10. The apparatus of claim 9, wherein the instructions, when executed by the one or more processors, cause the apparatus to cause display of the request to approve the one or more goods or services by causing the apparatus to:
display, based on the authorization request, an indication of the one or more goods or services to be purchased via the transaction.

11. The apparatus of claim 9, wherein the instructions, when executed by the one or more processors, cause the apparatus to:
determine the training data by recording one or more previous calls associated with the user.

12. The apparatus of claim 9, wherein the instructions, when executed by the one or more processors, cause the apparatus to identify the user by causing the apparatus to:
execute one or more facial recognition algorithms.

13. The apparatus of claim 9, wherein the instructions, when executed by the one or more processors, cause the apparatus to prompt the user by causing the apparatus to:
receive, from the server, merchant history data that indicates a history of transactions associated with a merchant;
compare the transaction to the history of transactions associated with the merchant; and
cause, based on the comparing, display of an indication of whether the transaction is similar to the history of transactions associated with the merchant.

14. The apparatus of claim 9, wherein the communications session is initiated by an application different from the secure transaction application.

15. The apparatus of claim 9, wherein the instructions, when executed by the one or more processors, cause the apparatus to transmit the authorization of the transaction by causing the apparatus to:
cause the server to transmit, to a computing device associated with a participant of the communications session, the payment information.

16. The apparatus of claim 9, wherein the instructions, when executed by the one or more processors, cause the apparatus to:
receive, by the secure transaction application, a request to initiate the communications session; and
initiate, by a second application executing on the apparatus and in response to the request, the communications session.

17. One or more non-transitory computer-readable media storing instructions that, when executed, cause:
generating a trained machine learning model by training, using training data comprising a history of voice samples captured during past calls by a user, a machine learning model to identify the user based on voice samples of the user;
detecting, by a secure transaction application executing on a computing device, first user input corresponding to a user interface element that initiates, by the computing device, a communications session, wherein the communications session is one of: a voice call, or a video call;
receiving, by the secure transaction application, from a server, and during the communications session, an authorization request corresponding to a transaction, wherein the authorization request is received via a first communications channel that is different from a second communications channel used for the communications session;
causing display, via a user interface of the secure transaction application executing on the computing device, of a request to approve one or more goods or services to be purchased via the transaction;
receiving, via the user interface of the secure transaction application, in response to the request, and during the communications session, second user input indicating whether the transaction is authorized;
identifying, during the communications session, the user of the computing device by processing, using a trained machine learning model, voice data from the communications session, wherein the trained machine learning model was generated by training, using training data comprising a history of voice samples captured during past calls by a user, a machine learning model to identify the user based on voice samples of the user;
determining, by the secure transaction application, based on identifying the user, and based on comparing one or more properties of the transaction to a threshold, whether to authenticate a user of the computing device; and
in response to the second user input and based on determining to authenticate the user of the computing device, transmitting, to the server, an authorization of the transaction, wherein the authorization of the transaction is configured to cause the server to initiate payment for the transaction using payment information associated with the user.

18. The non-transitory computer-readable media of claim 17, wherein the instructions, when executed, cause display of the request to approve the one or more goods or services by:
displaying, based on the authorization request, an indication of the one or more goods or services to be purchased via the transaction.

19. The non-transitory computer-readable media of claim 17, wherein the instructions, when executed, further cause:
determining the training data by recording one or more previous calls associated with the user.

20. The non-transitory computer-readable media of claim 17, wherein the instructions, when executed, cause the identifying the user by causing:
executing, by the computing device, one or more facial recognition algorithms.

* * * * *